Sept. 22, 1970   YUKIO TOMITA ET AL   3,529,484
SYNCHRONIZING DEVICE

Filed Aug. 8, 1968                                     5 Sheets-Sheet 1

Sept. 22, 1970   YUKIO TOMITA ET AL   3,529,484
SYNCHRONIZING DEVICE
Filed Aug. 8, 1968   5 Sheets-Sheet 3

United States Patent Office 3,529,484
Patented Sept. 22, 1970

3,529,484
SYNCHRONIZING DEVICE
Yukio Tomita and Hideki Morino, Toyota, Japan, assignors to Toyota Jidosha Kogyo Kabushiki Kaisha, Toyota-cho, Toyota, Aichi Prefecture, Japan
Filed Aug. 8, 1968, Ser. No. 751,093
Claims priority, application Japan, Aug. 12, 1967, 42/51,538; Nov. 4, 1967, 42/70,719
Int. Cl. F16h 3/38
U.S. Cl. 74—339
6 Claims

ABSTRACT OF THE DISCLOSURE

A synchronizing device to be used in the transmission gear, etc. of an automobile having at least two rotating members coaxially arranged and separately rotatable, and a sliding member like a thrust block provided on one of the rotating members rotatable therewith and axially movable relative thereto is disclosed herein. A synchronizing member is attached to the sliding member opposite to and spaced from the synchronous contact surface of the other rotating member. An elastic means is used to separate the synchronizing member from the synchronous contact surface of the other rotating member, the synchronizing member being biased toward the synchronous contact surface of said other rotating member upon movement of the sliding member relative to the one rotating member.

BRIEF SUMMARY OF THE INVENTION

The present invention relates to a synchronizing device to be used in the transmission gear, etc. of an automobile.

It is known that the conventional device of this kind has the following structure: A hub-sleeve is fitted on the outside of the clutch hub which is splined to the rotating main shaft; said clutch hub has an axial groove, in which a shifting key is located; said shifting key is spring-biased against the inside surface of the hub-sleeve under the tension of the key spring. When the hub-sleeve is moved in the axial direction, the synchronizer ring installed adjacent to the hub-sleeve is pressed by the hub-sleeve and the shifting key, thereby accelerating and synchronizing the other gear by the frictional force; and in this stage the hub-sleeve can be made to mesh with the other gear through the synchronizer ring.

Though the abovementioned device is adequate in most applications, it has the drawback that the larger the difference in rotation, the longer it takes to synchronize.

The primary object of the present invention is to provide a synchronizing apparatus comprising multiple rotating members such as sleeves or a synchronizing part coaxially arranged and separately rotatable, said rotating members capable of being synchronized with each other through a sliding member like a thrust block provided on a first one of said rotating members solidly rotatable therewith and axially movable relative thereto, a synchronizing member attached to the sliding member opposite to the synchronous contact surface of the other of the rotating members and an elastic means like a leaf spring or rubber spring used to separate the synchronizing member from the synchronous contact surface of said other rotating member under normal operations. However, upon movement of the sliding member relative to one of the rotating members, the elastic means will deflect and allow the synchronizing member to engage the synchonizing contact surface of the second rotating member, thereby accelerating the second rotating member and smoothly actuating the two rotating members to synchronize with each other. A relative displacement of one rotating member with respect to the sliding member for a gear change will necessarily cause synchronization between rotating members thus, a gear change can be effected smoothly without clashing of gears.

Another object of this invention is to provide a synchronizing device in which an arc member like a ring spring is inserted between a synchronizing member and the other rotating member so that the total periphery of said arc member may come into frictional contact with the whole surface of said rotating member, thereby reducing the local surface pressure to said rotating member in the state of said arc member in contact with said rotating member where no local wear occurs on the synchronous contact surface of said rotating member, the distributed surface pressure grows larger toward the rotational end of said arc member, so that the frictional torque for synchronization can be increased to effect an enhanced synchronization.

Still another object of this invention is to provide a synchronizing device which comprises at least two rotating members like a sleeve and a synchronizer part coaxially arranged and separately rotatable, said rotating members being to synchronize with each other, a sliding member like a thrust block provided on one of said rotating members solidly rotatable therewith and axially movable relative thereto, the first synchronizing member like a synchronizing block consolidately attached to said sliding member opposite to the synchronous contact surface of the other of said rotating members, the second synchronizing member like a synchronizer ring provided on said other rotating member on the opposite bottom side of said first synchronizing member opposite to the synchronous contact surface of said other rotating member, synchronization being to take place on two opposite surfaces of synchronizing members, thereby increasing the capacity of the synchronizing device and facilitating the operation with the radial forces acting on the synchronizing members canceling each other in opposite directions and little reaction occurring in the operation.

The fourth object of this invention is to provide a synchronizing device which can effect an enhanced synchronizing action by providing said sliding member solidly with said synchronizing member in opposition to the synchronous contact surface of said other rotating member, attaching said second synchronizing member on the opposite side of said first synchronizing member which is opposite to the synchronous contact surface of said other rotating member, and further inserting an arc member like a ring spring between said first synchronizing member and said other rotating member.

BRIEF DESCRIPTION OF THE DRAWINGS

The details of the invention will be described with reference to the attached drawings, in which.

DETAILED DESCRIPTION

Figure 1:
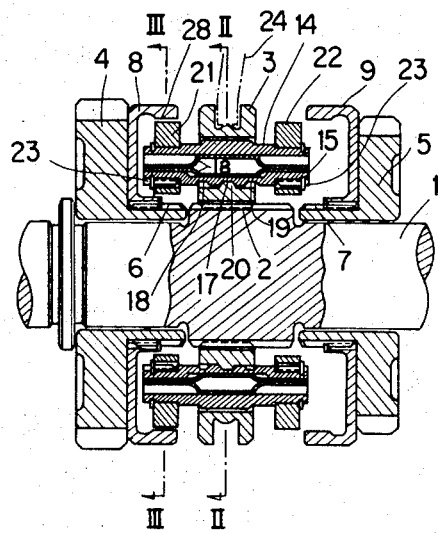
FIG. 1 is a longitudinal sectional view of a synchronizing apparatus according to the first embodiment of this invention.
Figure 2:
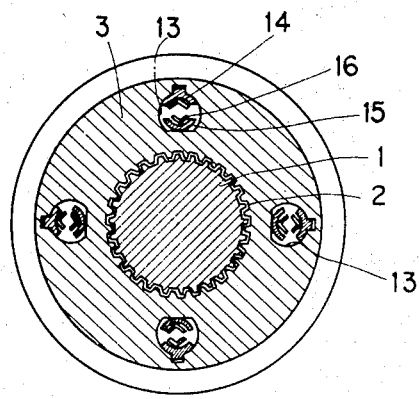
FIG. 2 is a sectional view along line II—II of FIG. 1.
Figure 3:
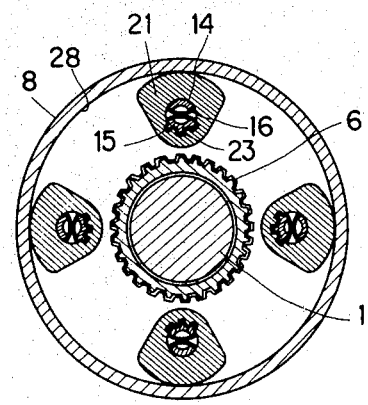
FIG. 3 is a sectional view along line III—III of FIG. 1.
Figure 4:
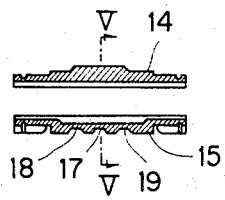
FIG. 4 is a longitudinal sectional view of an anchor block and a thrust block.
Figure 5:
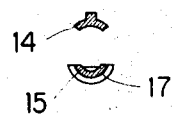
FIG. 5 is a sectional view along line V—V of FIG. 4.
Figure 6:
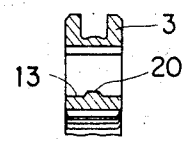
FIG. 6 is a partial longitudinal sectional view of a sleeve.

To explain the first embodiment of this invention with reference to FIGS. 1 to 6, a sleeve 3 is splined with a spline 2 provided in one part of a driving shaft 1. On both sides of said sleeve there are gears 4 and 5 loosely engaging the driving shaft 1. Splines 6 and 7 provided at the boss of said gear 4 and 5 are splined with synchronizing parts 8 and 9 to rotate solidly with said gears 4 and 5 respectively.

The sleeve 3 is bored with a plurality of holes 13, into each of which fit an anchor block 14 and a thrust block 15; and between the anchor block 14 and the thrust block 15 are inserted two leaf springs 16, 16 which tend to push aside said anchor block 14 and said thrust block 15. A groove 17 is cut at the bottom center of the thrust block 15 and grooves 18 and 19 are cut on both sides of groove 17.

There is a projection 20 at the bottom of the hole 13 bored in the sleeve 3, said projection 20, as described later which fits into the grooves 17, 18 and 19 on the thrust block 15.

On both sides of the anchor block 14 and the thrust block 15 there are fitted synchronizer blocks 21 and 22 which are firmly coupled with the thrust block 15 by means of teeth 23.

FIG. 1 shows a neutral state. To explain the action to take place when this state is switched to that of transmitting a rotating force to the gear, a force is imparted by a fork 24 shifting sleeve 3 shifted to the left (as shown in FIG. 1). Thereby the thrust block 15 will begin to shift leftward together with the sleeve 3, because the projection 20 of the sleeve 3 is engaged in the groove 17 of the thrust block 15.

An appropriate stop, i.e. synchronizing part 8, is provided so that the thrust block 15 may be halted after said block 15 has shifted leftward an appropriate distance.

If the sleeve 3 is shifted further leftward even after the leftward shifting of the thrust block 15 has been stopped, the left slope of the projection 20 of the sleeve 3 comes to slide with friction against the left slope of the groove 17 of the thrust block 15. Thereby the projection 20 pushes up the thrust block 15, which in turn deflects the leaf spring 16, and in consequence the thrust block 15 is pushed up toward the anchor block 14. When the anchor block 14 is pushed up, the synchronizer block 21 attached therewith is also pushed up and thereby the top edge of the synchronizer block 21 comes into frictional contact with the inside surface 28 of the synchronizing part 8.

When more of the leftward force is applied to the sleeve 3 by the fork 24, the projection 20 of the sleeve 3 pushes up the thrust block 15 closer to the anchor block 14 and as the result the frictional contact between the synchronizer block 21 and the synchronizing part 8 is further intensified.

The sleeve 3, which is splined with the driving shaft 1, rotates together with the driving shaft 1. The thrust block 15 and the synchronizer block 21 attached to said sleeve 3 also revolve around the axis of said driving shaft 1, while the gear 4 and the synchronizing part 8 are standing still. In this condition, if the synchronizer block 21 comes into frictional contact with the synchronizing part 8, the synchronizer block 21 comes to move axially.

Since the synchronizer block 21 is fastened to the thrust block 15, an axial displacement of the synchronizer block 21 will cause that of the thrust block 15, too, the axis of this motion of the synchronizer block 21 agreeing with that of the thrust block 15. This axial motion of the thrust block 15 continues until said block hits the anchor block 14 or it is balanced with the reaction of the leaf spring 16.

When the synchronizer block 21 and the synchronizing part 8 comes thus into frictional contact, the synchronizing part 8 begins to be accelerated in the rotational direction of the driving shaft 1.

The contact of the synchronizer block 21 against the synchronizing part 8 will be the stronger, exerting a wedge action and causing greater acceleration to the synchronizing part 8, as the axial motion angle of the synchronizer block 21 becomes the wider.

When the synchronizing part 8 is accelerated and its speed comes closer to the rotating speed of the driving shaft 1, i.e., that of the sleeve 3, the axial motion force on the synchronizer block 21 drops and in consequence the restoring force of the leaf spring 16 gradually brings the thrust block 15 and the synchronizer block 21 back to the original position.

If the sleeve 3 is moved more to the left at the moment when the frictional force is lost between the synchronizer block 21 and the synchronizing part 8, the sleeve 3 smoothly comes to mesh with the spline 6 of the gear 4, transmitting a driving force to the gear 4, provided that it has been so timed that the spline 2 of the sleeve 3 and the spline 6 of the gear 4 can engage with each other.

If the sleeve 3 is moved still more to the left, the projection 20 of the sleeve 3 goes into the groove 18. The thrust block 15 is pressed down by the leaf spring 16 and the synchronizer block 21 comes down, and in consequence the synchronizer block 21 will cease to contact the synchronizing part 8. When the projection 20 goes into the groove 18, the sleeve 3 engaging the spline 6 will be prevented from moving to the right, thereby preventing a failure of gear engagement.

Meanwhile, if the adhesion between the synchronizer block 21 and the synchronizing part 8 is excessive at the moment of the rotating speed of the synchronizing part 8 coming closer to that of the sleeve 3, the adhesion between the synchronizer block 21 and the synchronizing part 8 can be prevented by creating a step in the tooth between the grooves 18 and 17 by reducing the height of its left half and slightly lowering the thrust block 15 at the moment of completion of synchronization.

It would also be possible to provide only a groove 17, and not the grooves 18 and 19, in the thrust block 15, so that the synchronizer block 21 may remain in frictional contact with the synchronizing part 8 while the sleeve 3 engages with the spline 6.

Figure 7:
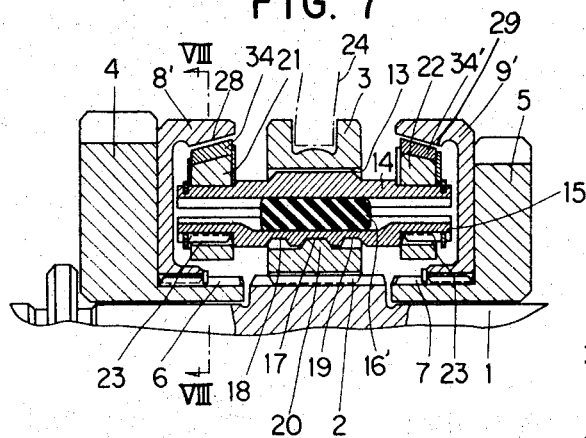
FIG. 7 is a partial longitudinal sectional view of a synchronizing apparatus according to the second embodiment of this invention.
Figure 8:
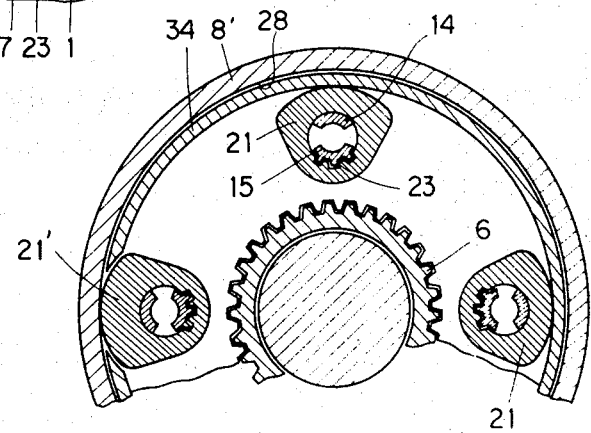
FIG. 8 is a sectional view along VIII—VIII of FIG. 7.
Figure 9:
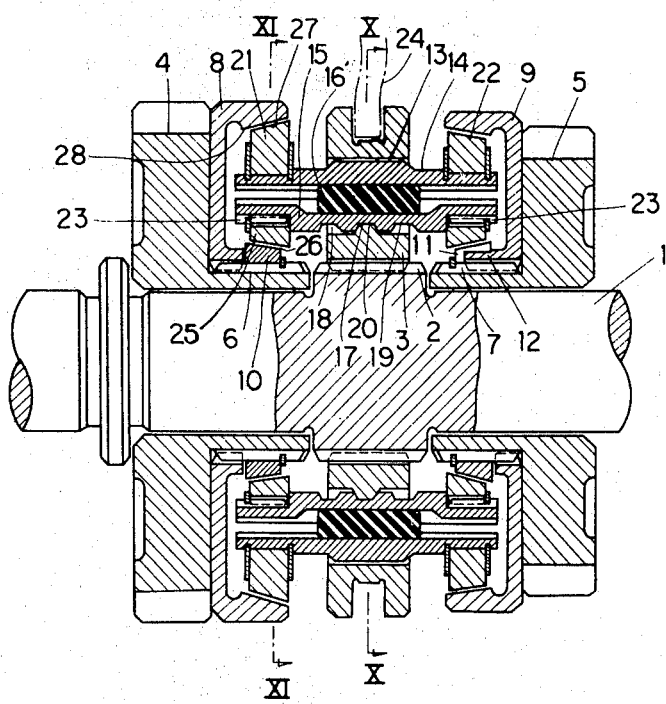
FIG. 9 is a longitudinal sectional view of the third embodiment of this invention.
Figure 10:
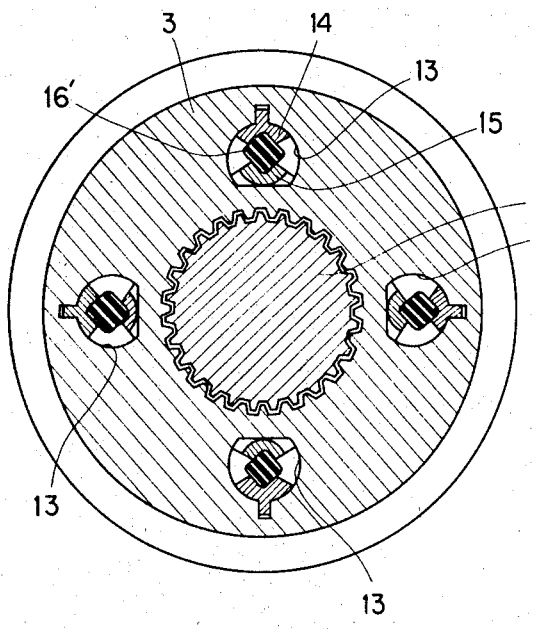
FIG. 10 is a sectional view along line X—X of FIG. 9.
Figure 11:
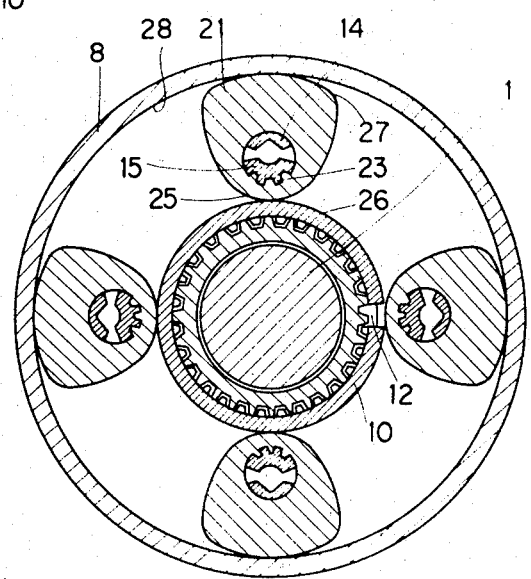
FIG. 11 is a sectional view along line XI—XI of FIG. 9.

FIGS. 7 and 8 illustrate another embodiment of this invention, with the same reference numerals employed for the same parts as in FIGS. 1 to 6.

In this embodiment, the synchronizing parts 8' and 9' having the inside synchronous contact surfaces 28 and 29 formed conical respectively are splined with the gears 4 and 5; a ring spring 34 is wound on the outside of the synchronizing blocks 21 and the two ends of the ring spring 34 are located on both sides of the synchronizing block 21'. And between the anchor block 14 and the thrust block 15 is inserted a rubber spring 16' as elastic means.

Said ring spring 34 is so designed as to tend to decrease its diameter under elasticity. When the fork 24 moves the sleeve 3 to the left and the synchronizer block 21 together with the thrust block 15 is pushed up, the synchronizer blocks 21 pushes the ring spring 34 outward, thereby causing the outside of the ring spring 34 to come into frictional contact with the inside of the synchronizing part 8'. In this case, even if the thrust block 15 is inclined under the dynamic balance, there is no possibility of the ring spring 34' of the synchronizer block 22 coming to contact the inside of the synchronizing part 9', because the inclined toothed surface between the sleeve 3 and the thrust block 15 is sloped such that the left end of the thrust block 15 is inclined upward, while the right end of it is inclined downward.

As shown in FIG. 8 when the outside of the ring spring 34 comes into frictional contact with the inside 28 of the synchronizing part 8', the ends of the ring spring 34 spread which allows the outer surface of the synchronizer block 21' to be biased into frictional contact with the inside 28 of the synchronizing part 8'. In this way, the synchronizing part 8' is accelerated to the speed of driving shaft 1 by the frictional contact of the ring spring 34 and the synchronizer block 21' with synchronizing part 8'.

The above explanations of the first and second embodiments of this invention refer to the case when the sleeve 3 is pushed to the left, and the synchronizer block 21 or 21' comes into frictional contact with the synchronizing part 8 or 8' causing the latter to be accelerated to a synchronous speed. When the sleeve 3 is pushed to the right, the same action will take place, accelerating the synchronizing part 9 or 9' and synchronizing it with the rotating speed of the driving shaft 1.

To explain the third embodiment of this invention, reference is made to FIGS. 9 to 12, where spline 2 provided on one part of the driving shaft 1 is splined with the sleeve 3 and on both sides of the sleeve there are the gears 4 and 5 loosely fitting with the driving shaft 1. The splines 6 and 7 provided on the bosses of the gears 4 and 5 are splined with the synchronizer parts 8 and 9, which are rotatably fixed relative to the gears 4 and 5, respectively. On the peripheries of the splines 6 and 7 on the gears 4 and 5 are fitted, synchronizer rings 10 and 11 adjoining the synchronizer parts 8 and 9, the ends of the synchronizer rings 10, 11 are in contact with a stopper 12 respectively provided on the synchronizer parts 8 and 9.

The sleeve 3 as shown in FIGS. 9 to 12 has several holes 13, each of which is fitted with an anchor block 14 and a thrust block 15 and between these blocks 14, 15 is inserted a rubber spring 16', which biases apart the anchor block 14 and said thrust block 15.

At both ends of the anchor block 14 and the thrust block 15 there are fitted the synchronizer blocks 21 and 22, which are firmly coupled with the thrust block 15 by means of teeth 23.

To describe the operation of this embodiment, reference is made to FIGS. 9 to 12. To start a fork 24 attached to a gearshift or other actuating mechanism (not shown) gives a leftward (in FIG. 9) motion to the sleeve 3. With the projection 20 of the sleeve 3 engaged in the groove 17 of the thrust block 15, the thrust block begins a shift leftward with the sleeve 3. At the same time as the leftward movement of the thrust block 15, the synchronizer block 21 also moves to the left and soon the bottom surface 25 of the synchronizer block 21 comes into contact with the slope 26 on the periphery of the synchronizer ring 10. When the surface 25 of the synchronzer block 21 and the surface 26 of the synchronizer ring 10 first come to contact together, the synchronizer ring 10 will start to accelerate. The further left the sleeve 3 is moved, the greater will be the frictional contact between the sloping interfaces 25, 26 of the synchronizer block 21 and synchronizer ring 10 respectively. Also the sloped interfaces 25, 26 will drive the synchronizer block 21 radially outward the further left sleeve 3 is moved. When this occurs, the outside inclined surface 27 of the synchronizer block 21 comes into contact with the inside inclined surface 28 of the synchronizer part 8, thereby increasing the synchronizing action of synchronizer part 8.

When the synchronizer part 8 under synchronization becomes steadily accelerated and its speed comes closer to the rotating speed of the driving shaft 1, i.e., that of the sleeve 3, the friction between the surfaces 25 and 26 and between the surfaces 27 and 28 diminishes and the tilted synchronizer block 21 gradually reverts to the original positon under the restoring action of the rubber spring 16'. If thereupon the sleeve 3 is shifted further to the left, the sleeve 3 will smoothly come to engage the spline 6 of the gear 4, thereby transmitting the driving force to the gear 4. If the sleeve 3 is shifted still further to the left, the projection 20 of the sleeve 3 will fit into the groove 18 on thrust block 15. The sleeve 3 will perfectly engage the spline 6 or the gear 4, at the same time creating a gap between the surfaces 25 and 26 and between the surfaces 27 and 28; thus completing the smooth shift of gears.

Figure 13:
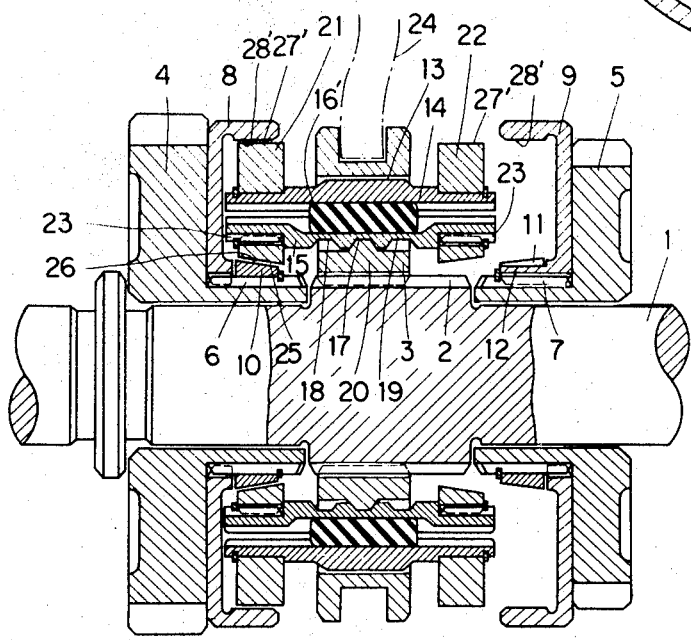
FIG. 13 is a longitudinal sectional view of a synchronizing apparatus according to the fourth embodiment of this invention.
Figure 12:
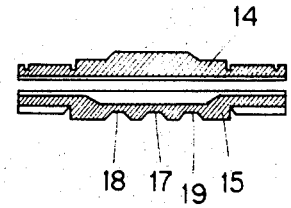
FIG. 12 is a longitudinal sectional view of an anchor block and a thrust block.

FIG. 13 illustrates the fourth embodiment of this invention, with the same reference numerals employed for the same parts as in FIGS. 9 to 12. In this embodiment the inside surface 28' respectively of the synchronizer parts 8 and 9 and the outside surface 27' respectively of the synchronizer blocks 21 and 22 are formed cylindrical rather than conical for the sake of simplifying the fabrication, but the operation of this embodiment is otherwise the same as that of the third embodiment illustrated in FIGS. 9 to 12.

Figures 14, 15:
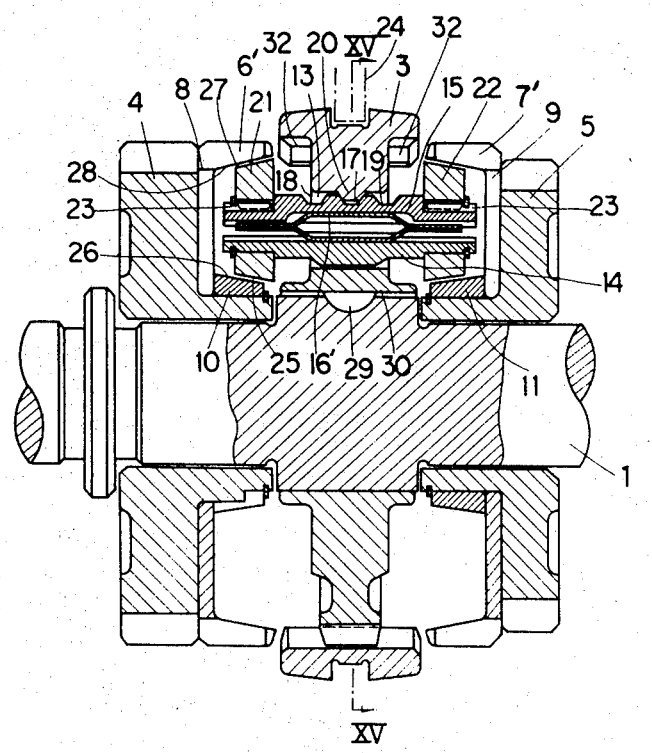
FIG. 14 is a longitudinal sectional view of a synchronizing apparatus according to the fifth embodiment of this invention.
FIG. 15 is a sectional view along line XV—XV of FIG. 14.

In the fifth embodiment illustrated in FIGS. 14 and 15, the driving shaft 1 has a clutch hub 30 coupled by means of a key 29; the sleeve 3 is coupled to said clutch hub 30 by means of the teeth 31; accordingly the sleeve 3 can rotate solidly with the driving shaft 1 and moreover it is movable in the axial direction of the driving shaft 1. The positions of the anchor block 14 and the thrust block 15 are reversed and they are inserted between the sleeve 3 and the clutch hub 30. Further, a metal spring 16' composed of two leaf springs is inserted between the anchor block 14 and the thrust block 15. Meanwhile, on the outside periphery of the synchronizer parts 8 and 9 are provided the splines 6' and 7' which are to engage the spline 32 provided on the inside periphery of the sleeve 3. In this embodiment as in the others, the surfaces 27 and 28 can be made either conical or cylindrical such as illustrated in FIG. 13. Synchronization of gears 4 or 5 with driving shaft is accomplished in substantially the same manner as the previous embodiments, the basic difference being one of structure, i.e., location of the splines 6' and 7'.

Figure 16:
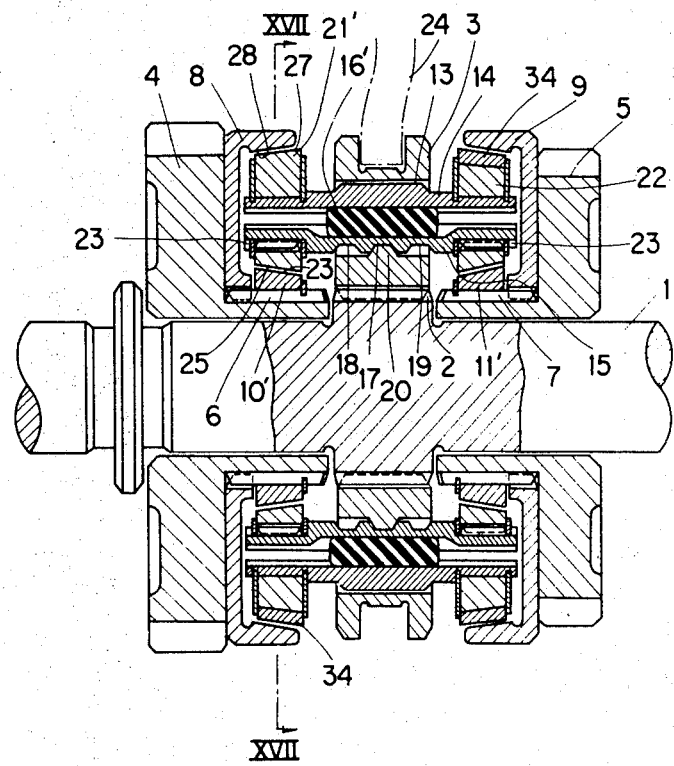
FIG. 16 is a longitudinal sectional view of the sixth embodiment of this invention.
Figure 17:
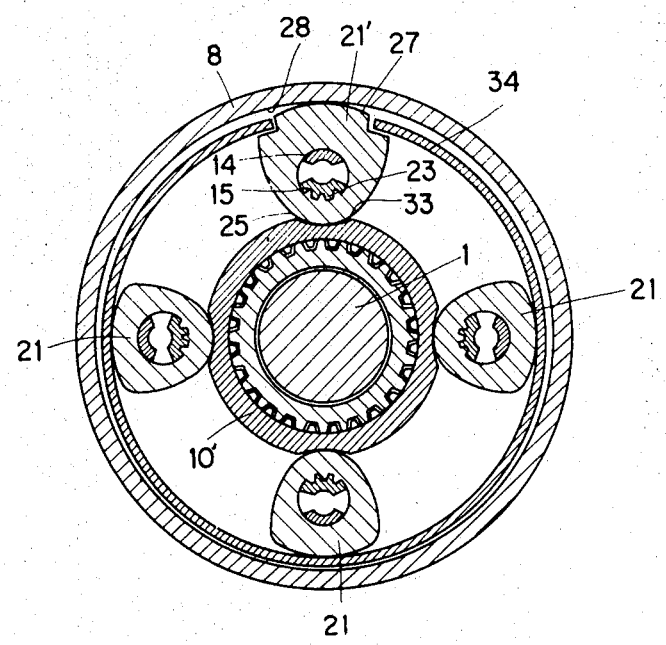
FIG. 17 is a sectional view along line XVII—XVII of FIG. 16.

In the sixth embodiment illustrated in FIGS. 16 and 17, the synchronizer rings 10' and 11' are annular but are provided on their outer periphery with recesses 33, into which the respective bottom surfaces 25 of the synchronizer blocks 21 and 21' come into contact with the synchronizer rings 10' and 11'. A ring spring 34 is also fitted between the outside of the synchronizer blocks 21 and the inclined surface of the synchronizer member 8, with one synchronizer block 21' interspersed between the ends of ring spring 34 and in direct contact with surface 28 of synchronizing part 8. When a weak displacing force due to the synchronizing action acts on the synchronizer ring 10', the synchronizer ring 10' moves axially, thereby its recesses 33 pushing outward the synchronizer blocks 21 and 21'; and the surface 27 of the synchronizer block 21' and the outside of the ring spring 34 are made to come into frictional contact with the inclined surface 28 of the synchronizer part 8, thereby effecting a strong synchronizing action. In this embodiment, the surfaces 27 and 28 may also be made cylindrical as well as conical.

In the embodiments illustrated in FIGS. 9 to 15 also the same ring spring 34 as shown in the embodiment of FIGS. 16 and 17 may be provided on the outside of the synchronizer blocks 21 and 22.

What is claimed is:

1. A synchronizing device comprising at least two rotating members coaxially arranged and separately rotatable, a plurality of sliding members provided on one of said rotating members rotatable therewith and axially movable relative thereto, an individual synchronizing member flexibly attached to each of the plurality of said sliding members, each synchronizing member having a bearing surface opposite to a synchronous contact surface of the other of said rotating members, an elastic means which normally biases said synchronizing members from the synchronous contact surface of said other rotating member, and means for moving said synchronizing members close to the synchronous contact surface of said other rotating member upon relative displacement between said one rotating member and said sliding members.

2. A synchronizing device comprising at least two rotating means coaxially arranged and separately rotatable, a sliding member provided on one of said rotating members rotatable therewith and axially movable relative thereto, synchronizing members flexibly attached to said sliding member having a bearing surface opposite to a synchronous contact surface of the other of said rotating members, a resilient ring spring arranged between at least one of said synchronizing members and the synchronous contact surface of said other rotating member, an elastic means which normally separates said synchronizing member from the synchronous contact surface of said other rotating member, and a means for moving said synchronizing member and said ring spring close to the synchronous contact surface of said other rotating member upon relative displacement between said one rotating member and said sliding member.

3. A synchronizing device comprising at least two rotating members coaxially arranged and separately rotatable, a plurality of sliding members provided on one of said rotating members rotatable therewith and axially movable relative thereto, an individual synchronizing member flexibly attached to each of the plurality of said sliding members, each synchronizing member having a bearing surface opposite to a synchronous contact surface of the other of said rotating members, an elastic means which normally biases said synchronizing members from the synchronous contact surface of the other of said rotating members, each of said individual synchronizing members engaging the synchronous contact surface of the other of said rotating members at two points thereon when the synchronizing members are brought into contact with the synchronous contact surface, and means for bringing said individual synchronizing members in contact with the synchronous contact surface of the other of said rotating members upon relative displacement between said first rotating member and the plurality of sliding members.

4. A synchronizing device comprising at least two rotating members coaxially arranged and separately rotatable, a sliding member provided on one of said rotating members solidly rotatable therewith and axially movable relative thereto, a first synchronizing member flexibly attached to said sliding member having a bearing surface opposite to a synchronous contact surface of the other of said rotating members, a ring spring inserted between said first synchronizing member and the synchronous contact surface, an elastic means which normally separates said first synchronizing member from the synchronous contact surface of said other rotating members, a second synchronizing member provided on said other rotating member on the opposite side from said first synchronizing member and a means for bringing said first synchronizing member in contact with said second synchronizing member and said other rotating member upon relative displacement between said one rotating member and said sliding member.

5. A synchronizing device as in claim 1 wherein each of the individual synchronizing members is wedge-shaped.

6. A synchronizing device as in claim 3 wherein each of the individual synchronizing members is wedge-shaped.

References Cited

UNITED STATES PATENTS

| | | | |
|---|---|---|---|
| 3,078,975 | 2/1963 | Eaton | 192—53 |
| 3,080,028 | 3/1963 | Kennedy | 192—53 |
| 3,110,382 | 11/1963 | Jones | 74—339 X |

LEONARD H. GERIN, Primary Examiner